(12) United States Patent
Rioux

(10) Patent No.: US 11,493,134 B2
(45) Date of Patent: *Nov. 8, 2022

(54) EXPANSION SEAL

(71) Applicant: United Technologies Corporation, Farmington, CT (US)

(72) Inventor: Philip Robert Rioux, North Berwick, ME (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 102 days.

This patent is subject to a terminal disclaimer.

(21) Appl. No.: 16/600,073

(22) Filed: Oct. 11, 2019

(65) Prior Publication Data

US 2020/0056703 A1    Feb. 20, 2020

Related U.S. Application Data

(63) Continuation of application No. 14/872,640, filed on Oct. 1, 2015, now Pat. No. 10,443,736.

(51) Int. Cl.
*F16J 15/40* (2006.01)
*F01D 11/00* (2006.01)
(Continued)

(52) U.S. Cl.
CPC .............. *F16J 15/40* (2013.01); *F01D 9/041* (2013.01); *F01D 11/005* (2013.01);
(Continued)

(58) Field of Classification Search
CPC . F01D 9/00; F01D 9/041; F01D 5/148; F01D 11/00; F01D 11/005; F01D 11/02;
(Continued)

(56) References Cited

U.S. PATENT DOCUMENTS 3,940,153 A * 2/1976 Stocker ................ F16J 15/4472
277/418
4,351,532 A * 9/1982 Laverty ................ F16J 15/4472
277/419
(Continued)

FOREIGN PATENT DOCUMENTS

GB      2447892 A    10/2008
WO      0070193 A1   11/2000
(Continued)

OTHER PUBLICATIONS

European Office Action Issued In EP Application No. 16 191 170.6; dated Jul. 25, 2018, 5 Pages.
(Continued)

*Primary Examiner* — Nathan Cumar
(74) *Attorney, Agent, or Firm* — Cantor Colburn LLP

(57) ABSTRACT

A sealing system for a gas turbine engine includes a first surface and a second surface spaced a dimension away from the first surface defining a gap through which a fluid can flow. At least one recess is formed in one of the first surface and the second surface and is oriented such that the fluid flow through the gap crosses the at least one recess. The recess is configured to restrict the fluid flow through the gap in comparison to if the at least one recess were not present, all other things being equal.

8 Claims, 4 Drawing Sheets

(51) Int. Cl.
  *F01D 9/04* (2006.01)
  *F01D 11/02* (2006.01)
(52) U.S. Cl.
  CPC ........ *F01D 11/025* (2013.01); *F05D 2220/32* (2013.01); *F05D 2240/55* (2013.01)
(58) Field of Classification Search
  CPC . F01D 11/025; F05D 2220/32; F05D 2240/55
  USPC ............ 277/304, 316, 345; 415/199.5, 173.1
  See application file for complete search history.

(56) References Cited

U.S. PATENT DOCUMENTS

| | | | | |
|---|---|---|---|---|
| 4,623,298 | A * | 11/1986 | Hallinger | F01D 11/12 415/139 |
| 5,029,876 | A * | 7/1991 | Orlando | F16J 15/4472 277/419 |
| 5,480,162 | A * | 1/1996 | Beeman, Jr. | F01D 9/023 277/355 |
| 6,834,860 | B2 * | 12/2004 | Rinaldo | F16J 15/4472 277/418 |
| 8,303,257 | B2 * | 11/2012 | Heinz-Schwarzmaier | F01D 11/005 277/418 |
| 2004/0208748 | A1 | 10/2004 | Schwartz et al. | |
| 2005/0017458 | A1 * | 1/2005 | Turnquist | F16J 15/442 277/412 |
| 2005/0104300 | A1 * | 5/2005 | Hogg | F01D 11/025 277/411 |
| 2009/0148277 | A1 * | 6/2009 | Tholen | F01D 11/025 415/173.1 |

FOREIGN PATENT DOCUMENTS

| | | |
|---|---|---|
| WO | 2011138193 A1 | 11/2011 |
| WO | 2014127954 A1 | 8/2014 |

OTHER PUBLICATIONS

European Search Report and Written Opinion; International Application No. 16191170.6; International Filing Date: Sep. 28, 2016; dated Mar. 10, 2017.

Unknown; "Gas Turbine Engineering Handbook"; 2006; pp. 526-528.

* cited by examiner

EXPANSION SEAL

CROSS-REFERENCE TO RELATED APPLICATIONS

This application is a continuation application of U.S. patent application Ser. No. 14/872,640 filed Oct. 1, 2015, which is incorporated herein by reference in its entirety.

BACKGROUND

This disclosure relates to a gas turbine engine, and more particularly to gaspath leakage seals for gas turbine engines.

Gas turbine engines, such as those used to power modern commercial and military aircrafts, generally include a compressor section to pressurize an airflow, a combustor section for burning hydrocarbon fuel in the presence of the pressurized air, and a turbine section to extract energy from the resultant combustion gases. The airflow flows along a gas path through the gas turbine engine. Along the gas path, there are many potential leakage paths, such as joints between mating components, that can reduce the efficiency of the system.

Traditionally, the leakage paths are addressed by the inclusion of physical seals, such as rope seals or W seals between the mating parts. Such methods, however, suffer challenges due to durability, FOD (foreign object damage), sealing effectiveness, cost, and design space/size restrictions. Some leakage paths are only 0.010" between mating surfaces with no extra design space to fit a physical seal. Other locations are very close to the gas path where FOD is a real concern, particularly for fragile hardware like rope, or W seals. These restrictions often lead to designs where attempting to minimize gaps has often been a selected design criteria.

SUMMARY

In one embodiment, a sealing system for a gas turbine engine includes a first surface and a second surface spaced a dimension away from the first surface defining a gap through which a fluid can flow. At least one recess is formed in one of the first surface and the second surface and is oriented such that the fluid flow through the gap crosses the at least one recess. The recess is configured to restrict the fluid flow through the gap in comparison to if the at least one recess were not present, all other things being equal.

Additionally or alternatively, in this or other embodiments the at least one recess forms sharp corners where the at least one recess intersects with the one of the first surface or the second surface in which the recess is formed.

Additionally or alternatively, in this or other embodiments the at least one recess is at least two recesses, a first of the two recesses being formed in the first surface and a second of the two recesses being formed in the second surface.

Additionally or alternatively, in this or other embodiments the first of the at least two recesses is positioned symmetrically across the gap from the second of the two recesses.

Additionally or alternatively, in this or other embodiments the first of the at least two recesses is positioned asymmetrically across the gap from the second of the two recesses.

Additionally or alternatively, in this or other embodiments the first of the two recesses is dimensionally identical to the second of the two recesses.

Additionally or alternatively, in this or other embodiments the at least two recesses is at least four recesses, with at least two recesses located at the first surface and at least two recesses located at the second surface.

Additionally or alternatively, in this or other embodiments the reduction in the fluid flow through the gap is restricted via rapid expansion and contraction of the fluid flow at the at least one recess.

In another embodiment, a gas turbine engine includes a first gas turbine engine component having a first surface and a second gas turbine engine component having a second surface. The second gas turbine engine component positioned such that the second surface and the first surface define a gap therebetween. At least one recess is formed in one of the first surface and the second surface and is oriented such that a fluid flow through the gap crosses the at least one recess. The recess is configured to restrict the fluid flow through the gap in comparison to if the at least one recess were not present, all other things being equal.

Additionally or alternatively, in this or other embodiments the at least one recess forms sharp corners where the at least one recess intersects with the one of the first surface or the second surface in which the recess is formed.

Additionally or alternatively, in this or other embodiments the at least one recess is at least two recesses, a first of the two recesses being formed in the first surface and a second of the two recesses being formed in the second surface.

Additionally or alternatively, in this or other embodiments the first of the at least two recesses is positioned symmetrically across the gap from the second of the two recesses.

Additionally or alternatively, in this or other embodiments the first of the at least two recesses is positioned asymmetrically across the gap from the second of the two recesses.

Additionally or alternatively, in this or other embodiments the first of the two recesses is dimensionally identical to the second of the two recesses.

Additionally or alternatively, in this or other embodiments the at least two recesses is at least four recesses, with at least two recesses located at the first surface and at least two recesses located at the second surface.

Additionally or alternatively, in this or other embodiments the reduction in the fluid flow through the gap is restricted via rapid expansion and contraction of the fluid flow at the at least one recess.

In yet another embodiment, a method of sealing fluid flowing in a gas turbine engine includes abruptly enlarging and then closing a dimension between a first surface of a first gas turbine engine component and a second surface of a second gas turbine engine component along a length of a gap between the first surface and the second surface. A fluid flowing in the gap is expanded and contracted via the abrupt enlargement and closing of the dimension. The flow of fluid through the gap is restricted via the expansion and contraction of the fluid along the gap.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
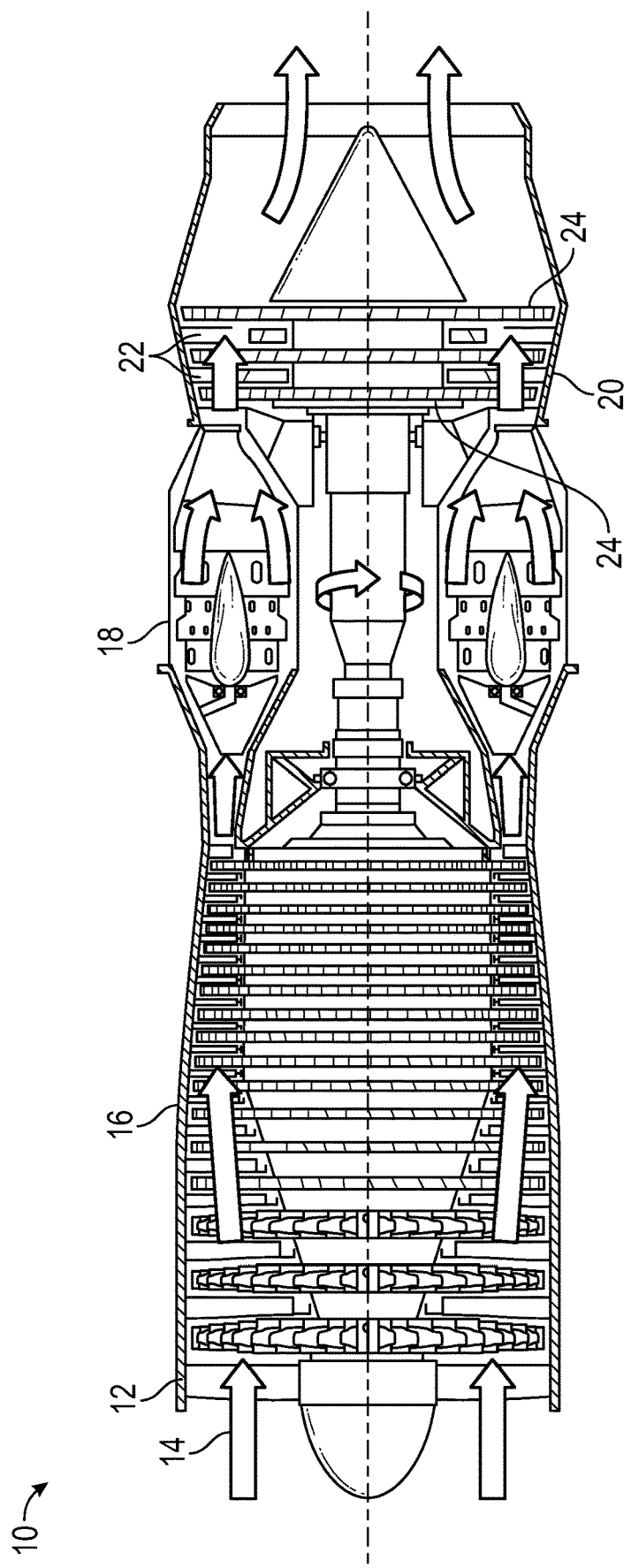
FIG. 1 illustrates a schematic cross-sectional view of an embodiment of a gas turbine engine.

FIG. 1 is a schematic illustration of a gas turbine engine 10. The gas turbine engine generally has a fan 12 through which ambient air is propelled in the direction of arrow 14, a compressor 16 for pressurizing the air received from the fan 12 and a combustor 18 wherein the compressed air is mixed with fuel and ignited for generating combustion gases.

The gas turbine engine 10 further comprises a turbine section 20 for extracting energy from the combustion gases. Fuel is injected into the combustor 18 of the gas turbine engine 10 for mixing with the compressed air from the compressor 16 and ignition of the resultant mixture. The fan 12, compressor 16, combustor 18, and turbine 20 are typically all concentric about a common central longitudinal axis of the gas turbine engine 10. In some embodiments, the turbine 20 includes one or more turbine stators 22 and one or more turbine rotors 24.

The gas turbine engine 10 may further comprise a low pressure compressor located upstream of a high pressure compressor and a high pressure turbine located upstream of a low pressure turbine. For example, the compressor 16 may be a multi-stage compressor 16 that has a low-pressure compressor and a high-pressure compressor and the turbine 20 may be a multistage turbine 20 that has a high-pressure turbine and a low-pressure turbine. In one embodiment, the low-pressure compressor is connected to the low-pressure turbine and the high pressure compressor is connected to the high-pressure turbine.

Figure 2:
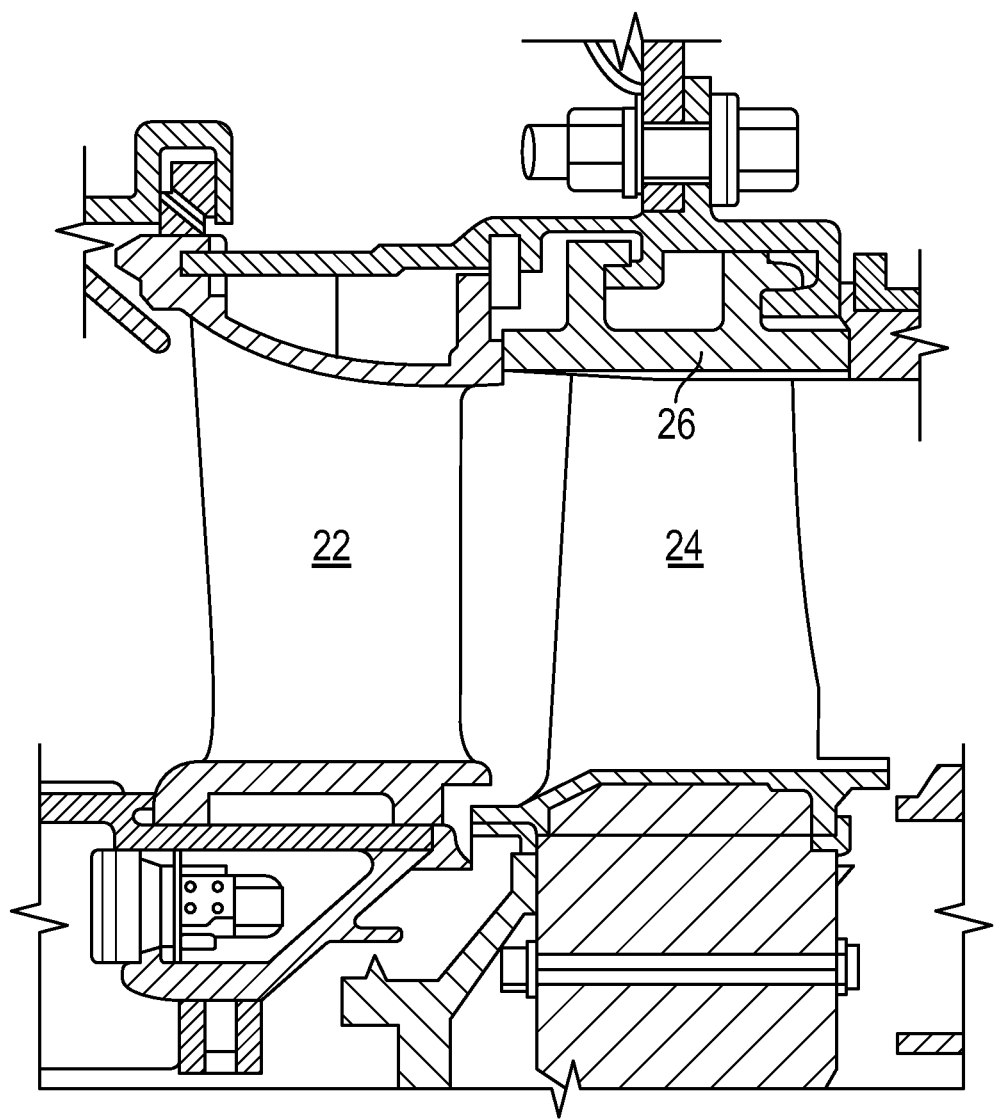
FIG. 2 illustrates an example of a component interface in a gas turbine engine.

The gas turbine engine 10 includes mating parts with gaps therebetween, either by design and/or as a result of manufacturing tolerances. Referring to FIG. 2, gaps may exist, for example, between a first component, such as a turbine stator segment 22, and a second component, such as a turbine outer air seal 26, or between circumferentially adjacent stator segments 22 and outer air seals 26. While turbine stator and outer air seals are described herein, it is to be appreciated that the first component and second component may denote any one of many adjacent component arrangements in the gas turbine engine 10, which may result in a leakage path between the first component and second component. These components may reside in the turbine 20, the compressor 16, combustor 18, or other portion of the gas turbine engine 10.

Figure 3:
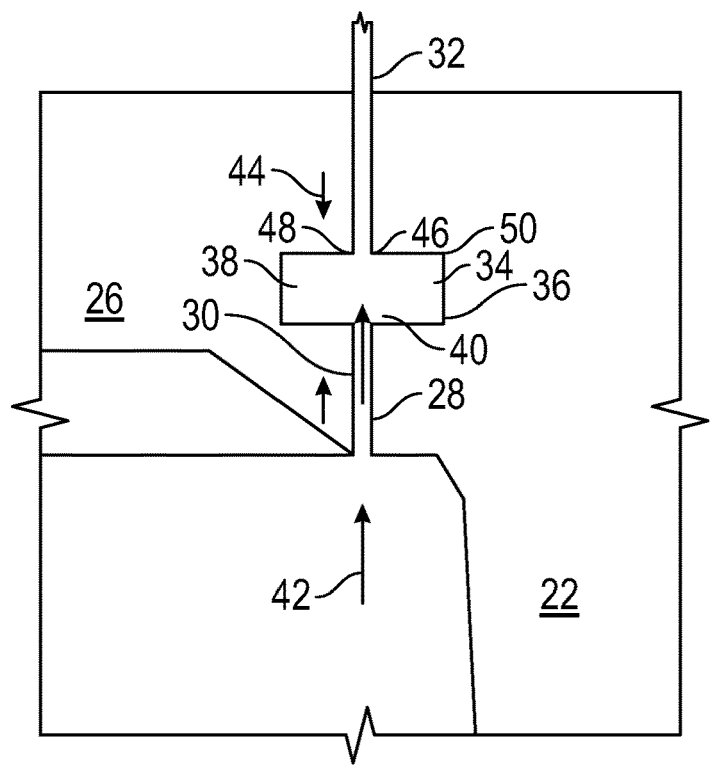
FIG. 3 illustrates an embodiment of a sealing arrangement at a component interface of a gas turbine engine.

Shown in FIG. 3 is a nonlimiting embodiment of a sealing arrangement between the stator segment 22 and the outer air seal 26. The stator segment 22 includes stator surface 28, which is axially offset some dimension from an air seal surface 30 of the outer air seal 26, defining a gap 32 between the stator surface 28 and the air seal surface 30. In some embodiments, the gap is about 0.010" or less. In other embodiments, the gap 32 is greater than 0.010".

Figure 4:
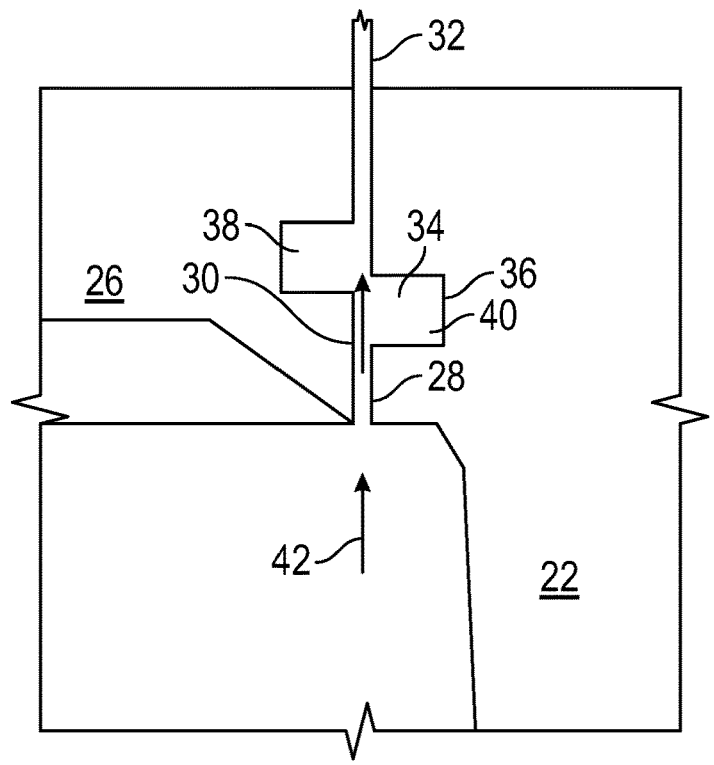
FIG. 4 illustrates another embodiment of a sealing arrangement at a component interface of a gas turbine engine.

A stator recess 34 is located along the stator surface 28 at the gap 32, and extends inwardly into the stator segment 22 to a stator recess depth 36. Similarly, an air seal recess 38 is located along the air seal surface 30 at the gap 32, opposite to the stator recess 34. The stator recess 34 and the air seal recess 38 define an expansion chamber 40 across the gap 32, such that airflow 42 flowing through the gap 32 expands at the expansion chamber 40. Downstream of the expansion chamber 40, the airflow is then quickly contracted again at the gap 32. This expansion and contraction of the airflow 42 in quick succession induces losses in the airflow 42 to restrict airflow 42 through the gap 32. The airflow 42 is unable to follow the abrupt change in boundary at the stator recess 34, leading to pockets of turbulent eddys at the stator recess 34, which dissipates mechanical energy of the airflow 42. When the mechanical energy of the airflow 42 is reduced, driving force, speed, pressure, total leakage and so forth are reduced. The stator recess 34 and the air seal recess 38 may be symmetrically located directly opposite each other across the gap 32, or alternatively as shown in FIG. 4 may be asymmetrically located, e.g., staggered relative to each other along the gap 32.

Referring again to FIG. 3, the stator recess 34 and the air seal recess 38 may have equal recess widths 44 and/or equal recess depths 36, or may be differently shaped as selected. A stator transition 46 between the stator surface 28 and the stator recess 38 is defined by a sharp corner, as is an air seal transition 48. The sharp transitions aid in achieving a quick expansion and contraction of the airflow 32. The stator recess 34 and/or the air seal recess 38 may include a fillet 50 at the recess depth 36 to reduce stresses in the stator recess 34 and/or the air seal recess 38.

Figure 5:
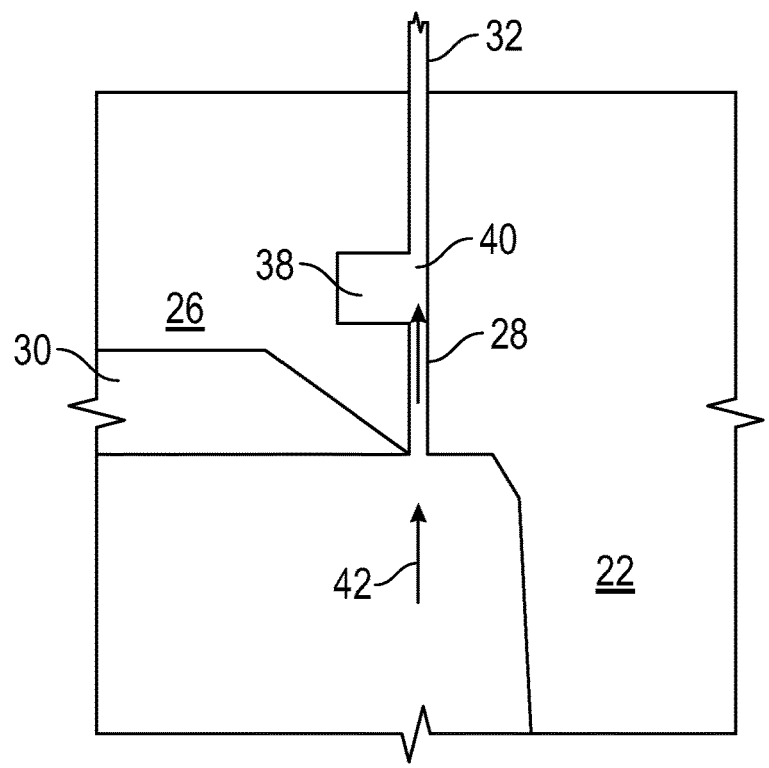
FIG. 5 illustrates yet another embodiment of a sealing arrangement at a component interface of a gas turbine engine.
Figure 6:
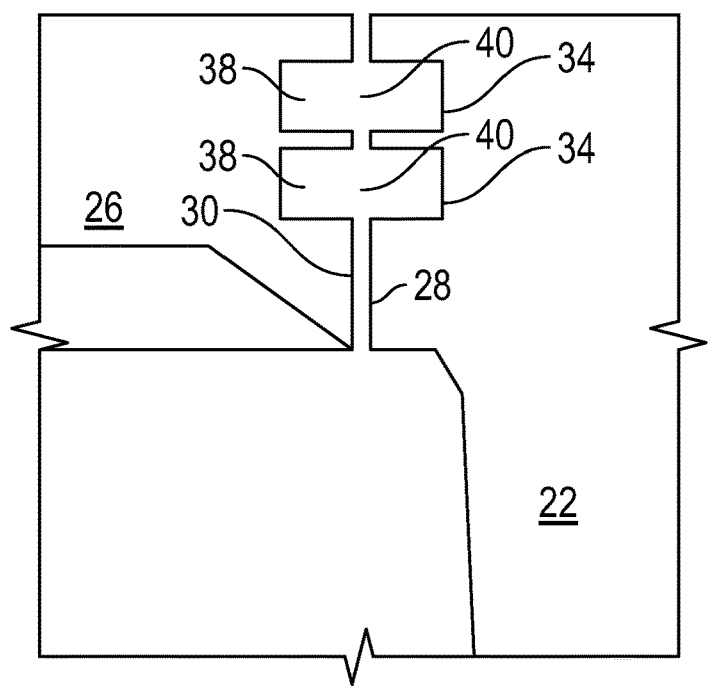
FIG. 6 illustrates still another embodiment of a sealing arrangement at a component interface of a gas turbine engine.

Examples of alternate embodiments of seal arrangements are illustrated in FIG. 5 and FIG. 6. In FIG. 5, the seal arrangement includes only one recess, either the stator recess 34 or the air seal recess 38. Referring now to FIG. 6, in another embodiment multiple pairs of stator recesses 34 and air seal recesses 38 are utilized to define two or more expansion chambers 40.

The sealing arrangements described and illustrated herein do not require additional hardware to implement, and may be applied to new engine configurations and are also able to be implemented in legacy engine configurations as refurbishment improvements. The seal arrangement reduces the risk of foreign object damage, and is able to be implemented in small design spaces, such as on small components of the gas turbine engine or across small gaps between components where traditional seal arrangements are impractical. The sealing arrangement does not require adherence to close tolerances and adds no loading or wear to the components. The sealing arrangement can easily be customized for specific locations and offer sealing possibilities to completely new locations in the gas turbine engine where traditional sealing arrangements are not utilized. Analysis shows leakage reductions of 14% to 36% compared to interfaces without a sealing arrangement.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A stator and blade outer airseal assembly of a gas turbine engine, comprising:
   a blade outer airseal having a radially extending first surface relative to a gas turbine engine central axis;
   a stator having a radially extending second surface relative to the gas turbine engine central axis and axially offset from the first surface defining an axial gap through which a fluid can flow; and
   at least one recess formed in one of the first surface and the second surface oriented such that the fluid flow through the axial gap crosses the at least one recess, the recess enlarging the axial gap, thereby urging expansion and then contraction of the fluid flow through the axial gap, thereby inhibiting fluid flow through the axial gap, the at least one recess including a first axially-extending recess surface, the first axially-extending recess surface extending directly axially from one of the first surface and the second surface, a second axially-extending recess surface offset from the first axially-extending recess surface, the second axially-extending recess surface extending directly axially from the one of the first surface and the second surface, and a radially-extending recess surface extending from the first axially-extending recess surface to the second axially-extending recess surface.

2. The stator and blade outer airseal assembly of claim 1, wherein the at least one recess forms sharp corners where the at least one recess intersects with the one of the first surface or the second surface in which the recess is formed.

3. The stator and blade outer airseal assembly of claim 1, wherein the at least one recess is at least two recesses, a first of the two recesses being formed in the first surface and a second of the two recesses being formed in the second surface.

4. The stator and blade outer airseal assembly of claim 3, wherein the first of the at least two recesses is positioned symmetrically across the gap from the second of the two recesses.

5. The stator and blade outer airseal assembly of claim 3, wherein the first of the at least two recesses is positioned asymmetrically across the gap from the second of the two recesses.

6. The stator and blade outer airseal assembly of claim 3, wherein the first of the two recesses is dimensionally identical to the second of the two recesses.

7. The stator and blade outer airseal assembly of claim 3, wherein the at least two recesses is at least four recesses, with at least two recesses disposed at the first surface and at least two recesses disposed at the second surface.

8. The stator and blade outer airseal assembly of claim 1, wherein the fluid flow through the gap is inhibited via rapid expansion and contraction of the fluid flow at the at least one recess.

* * * * *